(12) United States Patent
Louesdon et al.

(10) Patent No.: US 9,358,645 B2
(45) Date of Patent: Jun. 7, 2016

(54) ADAPTIVE MACHINING METHOD FOR SMELTED BLADES

(75) Inventors: Yvon Marie-Joseph Louesdon, Taverny (FR); Joseph Tami-Lizuzu, Suresnes (FR); Daniel Quach, Fontenay sous Bois (FR); Patrick Wehrer, Maisons Laffitte (FR); Didier Legeai, Montrouge (FR)

(73) Assignee: SNECMA, Paris (FR)

( * ) Notice: Subject to any disclaimer, the term of this patent is extended or adjusted under 35 U.S.C. 154(b) by 120 days.

(21) Appl. No.: 14/127,063

(22) PCT Filed: Jun. 21, 2012

(86) PCT No.: PCT/FR2012/051421
§ 371 (c)(1),
(2), (4) Date: Dec. 17, 2013

(87) PCT Pub. No.: WO2012/175882
PCT Pub. Date: Dec. 27, 2012

(65) Prior Publication Data
US 2014/0137409 A1 May 22, 2014

(30) Foreign Application Priority Data

Jun. 21, 2011 (FR) ...................................... 11 55424

(51) Int. Cl.
*B23P 15/02* (2006.01)
*G05B 19/4097* (2006.01)
*B23P 15/00* (2006.01)

(52) U.S. Cl.
CPC ............. *B23P 15/02* (2013.01); *G05B 19/4097* (2013.01); *B23P 15/006* (2013.01);
(Continued)

(58) Field of Classification Search
CPC ...... B23Q 15/007; B23Q 15/12; B23Q 15/14; B23Q 27/00; B23P 15/02; B23P 15/006; B23P 17/02; F05D 2230/10; F05D 2230/18; Y10T 29/4932; Y10T 29/49336; Y10T 29/49995
See application file for complete search history.

(56) References Cited

U.S. PATENT DOCUMENTS

| | | | |
|---|---|---|---|
| 6,678,575 B1 | 1/2004 | Graham et al. | |
| 2010/0095526 A1 | 4/2010 | Derrien et al. | |
| 2011/0009993 A1* | 1/2011 | Chuang et al. | .................. 700/98 |

FOREIGN PATENT DOCUMENTS

EP 1 398 683 3/2004

OTHER PUBLICATIONS

Gao, J., et al., "Adaptive restoration of complex geometry parts through reverse engineering application", Advances in Engineering Software, vol. 37, No. 9, pp. 592-600, (Sep. 2006), XP025013428.
(Continued)

*Primary Examiner* — Christopher Besler
(74) *Attorney, Agent, or Firm* — Oblon, McClelland, Maier & Neustadt, L.L.P.

(57) ABSTRACT

A method for finishing a shape of a component by machining, in which one area is produced by smelting with a thickened portion forming a first surface with a surrounding profile and a theoretical profile defined by a second surface, the method including: defining, on the second surface, a grid forming nodes and squares; defining each point over which the machining tool is to pass according to weighting coefficients equal to weight to be given to the nodes of the square in which the tool is located, to be the barycenter of assigned nodes of the coefficients; measuring, for each node located outside an outer limit, the delta between the first surface at the node and the theoretical position of the node; calculating deltas for each node within the outer limit by interpolation from already known deltas; using the weighting coefficients, defining the delta to be applied at each point.

8 Claims, 2 Drawing Sheets

(52) U.S. Cl.
CPC ... *F05D2230/10* (2013.01); *G05B 2219/35117* (2013.01); *G05B 2219/35128* (2013.01); *G05B 2219/45147* (2013.01); *Y10T 29/49336* (2015.01)

(56) References Cited

OTHER PUBLICATIONS

Songlin, D., et al., "Flow Line Machining of Turbine Blades", Intelligent Mechatronics and Automation, Proceedings. 2004 International Conference on Chengdu, China, pp. 140-145, (Aug. 2004), XP010764388.

Chen, L-C., et al., "Reverse engineering in the design of turbine blades—a case study in applying the MAMDP", Robotics and Computer Integrated Manufacturing, vol. 16, No. 2-3, pp. 161-167, (Apr. 2000), XP004198088.

International Search Report Issued Aug. 28, 2012 in PCT/FR12/051421 Filed Jun. 21, 2012.

* cited by examiner

ADAPTIVE MACHINING METHOD FOR SMELTED BLADES

BACKGROUND OF THE INVENTION

1. Field of the Invention

The present invention relates to the manufacture of turbine engine components and, in particular, the finishing of components produced by smelting or forging.

More generally, the invention relates to the finishing of blank components, of final dimensions, which still require final machining, or finishing. In particular it applies to smelted or forged turbojet engine blades.

2. Description of the Related Art

Turbine blades of turbine engines are generally made using the so-called "lost wax" technique, which directly produces the required shape for most of the component, without the need to produce a blank which then has to be machined to create the final shape. However, this technique still necessitates final machining, which comprises operations on the leading edge to remove transferred grains, operations on the trailing edge to remove a trailing edge strip and operations on the platform for its connection to the surface of the vane.

The smelting technique is not completely effective for producing very thin faces (or partitions), such as, for example at the trailing edges of blades and their ventilation air evacuation vents. In order to overcome this problem, the thin ends of the blades are smelted with a thickened portion, which is then removed by machining at the end of the manufacturing process. The problem with this method is that it is necessary to calibrate the reference for positioning the blade in the space used for this machining with that of the vane as it comes from the foundry. In the prior art the reference used is taken on the root of the blade and the vane is machined from the reference points taken on this root. This method gives rise to numerous dimensional irregularities and is time-consuming to implement. Because of the possible discrepancy between the reference taken on the root and that of the vane, there is often a lack of precision at the connection between the surface of the vane and the machined surface, with the appearance of projections on the surface of the component.

Moreover, a digitally controlled machine tool would ideally be used for these finishing operations to avoid dimensional irregularities.

BRIEF SUMMARY OF THE INVENTION

The object of the present invention is to overcome these problems by proposing a machining method for finishing smelted or forged components, whilst limiting dimensional irregularities and guaranteeing a good connection of the smelted or forged components with the machined parts of the component surface. This type of machining is known as adaptive machining because the path of the machine tool adapts to the geometry of the blank component.

The object of the invention is therefore a method for finishing the shape of a turbine engine blade by machining, in which at least one area is produced thicker than the required profile, the said thickened portion forming a first surface with the surrounding profile, the machining of the method being aimed at removing this thickened portion, using a suitable tool, to obtain a third surface, the theoretical profile of the component being, moreover, defined by a second surface, characterised in that it comprises the following steps to define the position of the bit of the said tool during machining of the said area:

defining, on the second surface, a grid formed by intersecting lines forming nodes and delimiting squares, the said grid covering the area to be machined and extending so that the outer limit of the machining area is completely enclosed within the outer limits of the grid, defining the position of each point of contact P between the tool/component for machining along the theoretical profile, by weighting with reference to the position of the nodes $N_i$ of the square in which it is located, measuring, for each node $N_i$ located outside the outer limit, the delta($N_i$) difference between the first surface at said node and the theoretical position of the node on the second surface, the said difference being measured normal to the second surface, calculating, step by step, the differences delta($N_j$) for each node $N_j$ located within the outer limit and selecting the square to which said node belongs and for which the delta ($N_i$) or delta ($N_j$) differences of the other nodes are already known, and interpolating from the said delta ($N_i$) or delta ($N_j$) differences, weighted according to the length of the segments connecting the said nodes, defining the delta(P) difference to be applied to each point P to obtain a point of contact P' between the component and the tool, relative to the reference input into the machine tool, by the weighted sum of the deltas($N_i$) of the nodes of the square to which the said point P belongs, using the said weighting performed with reference to the nodes $N_i$.

This method ensures that no projections are created between the machined surface and the surrounding surface and that these two surfaces join on the same tangential plane.

Preferably weighting is done by assigning weighting coefficients $CP_i$ to each point P, corresponding to the weight to be assigned to the nodes of said square so that it is the barycentre of said nodes assigned said coefficients. Advantageously the lines forming the grid are straight lines.

The polygons forming the squares are preferably four-sided polygons. In an alternative embodiment the polygons forming the squares are three-sided polygons.

In a particular embodiment at least one of the nodes located outside the outer limit is not borne by the first surface, the delta($N_i$) difference for this point therefore being calculated by interpolation between the delta($N_i$) differences of the adjacent nodes borne by said first surface, weighted according to the length of the segments connecting said nodes.

DETAILED DESCRIPTION OF THE SEVERAL VIEWS OF THE DRAWINGS

The following detailed explanatory description of an embodiment of the invention, given by way of an illustrative and non-limiting example and with reference to the attached schematic drawings, will provide a better understanding of the invention and better illustrate other applications, details, characteristics and advantages of it.

DETAILED DESCRIPTION OF THE INVENTION

Figure 1:
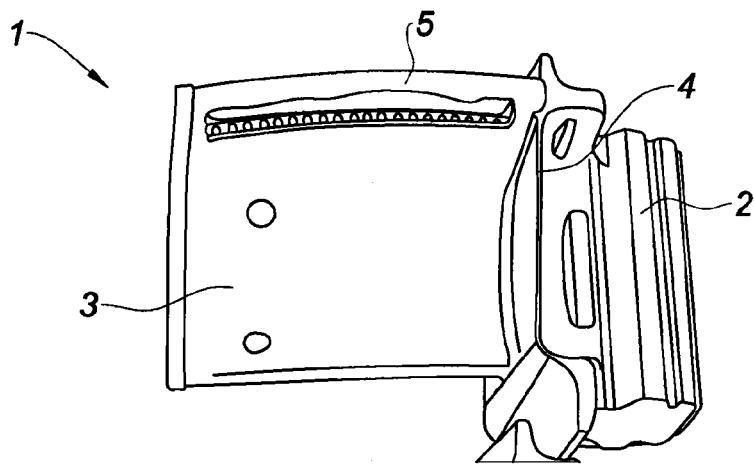
FIG. 1 is a front view of a high-pressure turbine engine blade, as a blank casting.

FIG. 1 shows a high pressure turbine rotor blade 1 at the end of "lost wax" smelting operations, seen from the intrados side. It comprises a root 2 and a vane 3 separated from each other by a platform 4. To ensure the strength of thinner parts, thickened areas have been left during smelting at the trailing edge outlet vents and at the connection between the vane 3 and the platform 4. A retaining strip 5, which is to be removed, has also been arranged parallel to the trailing edge to facilitate smelting operations.

Figure 2:
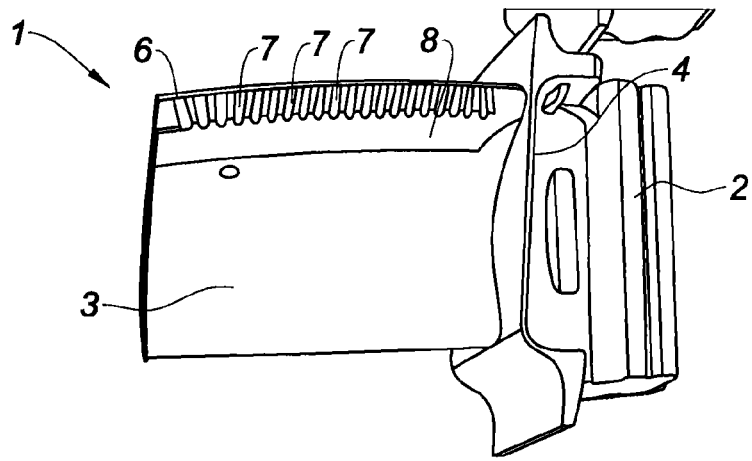
FIG. 2 is a front view of the blade from FIG. 1, after finishing using the method according to the invention.

FIG. 2 shows the same turbine blade after final machining, which consisted of removing the retaining strip 5 and thinning out the trailing edge 6. On the blade intrados one can see the machining area 8 which, by thinning out the intrados, reveals the ventilation outlets 7 of the trailing edge. For reasons of aerodynamic quality it is desirable to have tangential continuity between the machined surface and the rough smelted surface of the vane intrados at the margin of this machining area. Lastly, this machining operation finalised the connection between the vane 3 and the platform 4, in particular in the vicinity of the trailing edge, and the tip of the blade was planed down.

Figure 3:
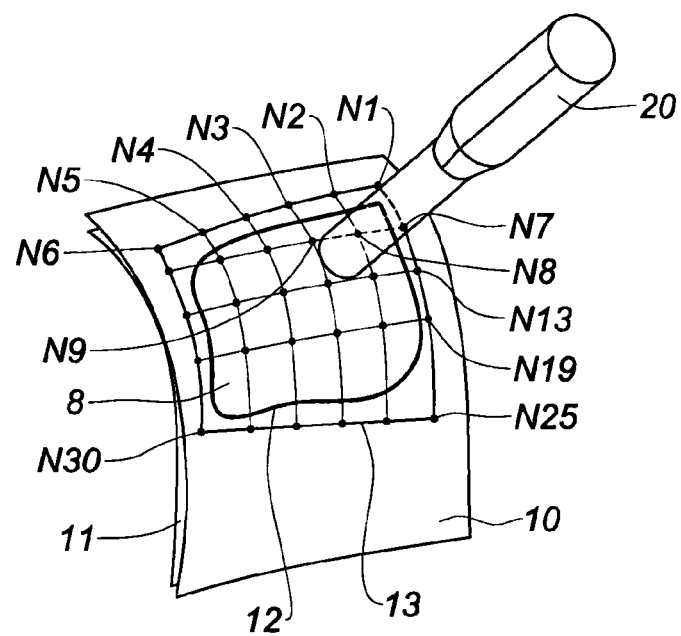
FIG. 3 is a perspective schematic view of an area to be machined using the method according to the invention.

In FIG. 3 one can see two outer surfaces and a machining area corresponding to two steps in the manufacture of the same smelted or forged component, part of which has a thickened area that is to be removed. A first surface 10 corresponds to the component following smelting or forging and a second surface 11 corresponds to the theoretical definition as designed by the digital model of the component to be produced. It is desirable for the surface 10 to be as close as possible to the surface 11, but without creating tangential discontinuities at the margin of the machining area 8. The outer limit 12 of the thickened area to be machined 8 and a grid with straight or curved segments 13, represented by its nodes referenced N1 to N30, are defined on the second surface 11.

A milling tool 20 is shown resting against the second surface 11 at a point P located in one of the squares of the grid 13. This tool, which is intended to machine the area 8 so as to thin the vane intrados, inside the limit 12, until the first surface 10 approaches the second surface 11 is inclined relative to the surface to be machined to obtain optimum cutting conditions.

Figure 4:
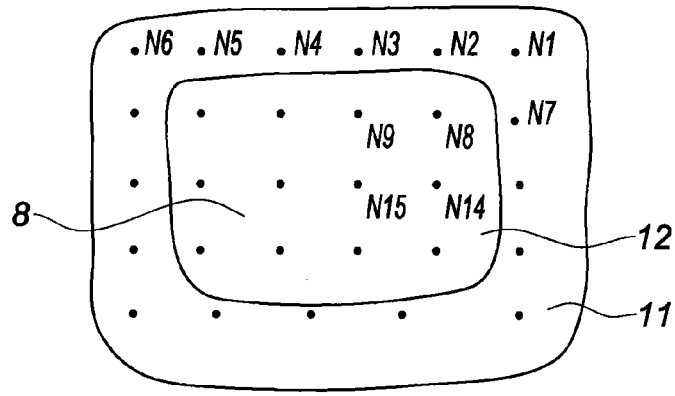
FIG. 4 is a schematic view of the area shown in FIG. 3 and its surrounding area.

FIG. 4 shows the same second surface 11 and the machining area 8 with the distribution of the nodes of the grid 13 drawn on it. This is drawn so that it completely encloses the machining area 8, even if certain points on its four sides do not physically lie on the second surface 11. Thus all the points of the grid 13 positioned over the area 8 are located between two other points of the grid which are outside the machining area.

Figure 5:
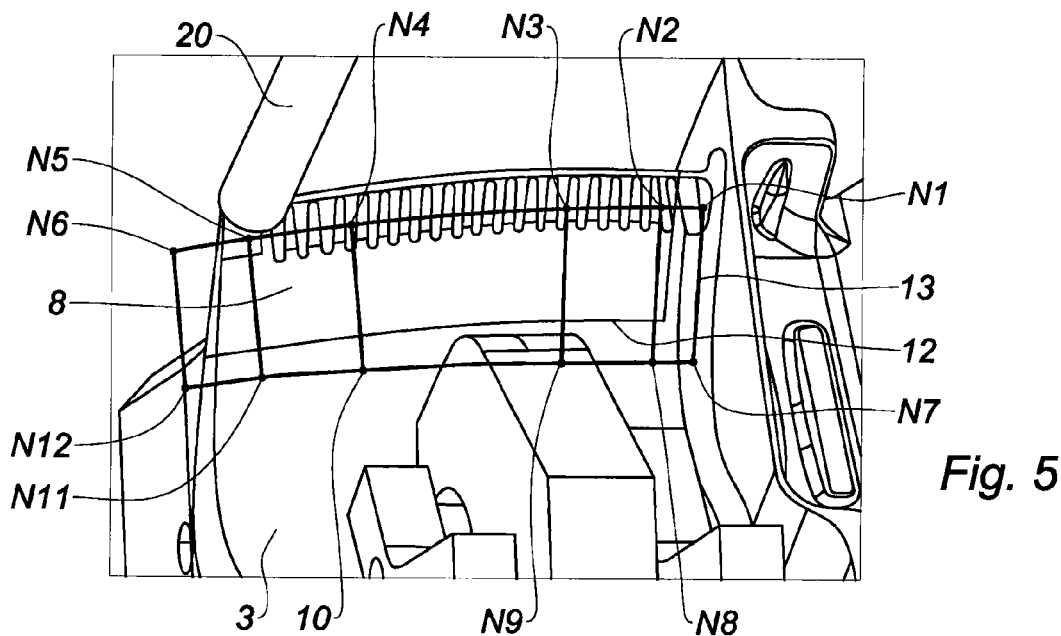
FIG. 5 is a perspective view of the intrados of a turbine blade machined using the method according to the invention.

FIG. 5 shows the application of a grid onto the intrados of a high pressure turbine blade 1 positioned on a digitally-controlled machine tool, the tool 20 of which is shown in contact with its trailing edge. Only one row of squares is represented, the vertices, or nodes, of which enclose the machining area 8. In the case shown one can see that only the nodes referenced N8 to N11 correspond to points located on the surface of the blade intrados, whilst points N1 to N6 of the outer edge and points N7 and N12 of the lateral edges of the grid 13, are located in a completely physically unsupported area associated with the vane 3.

Figure 6:
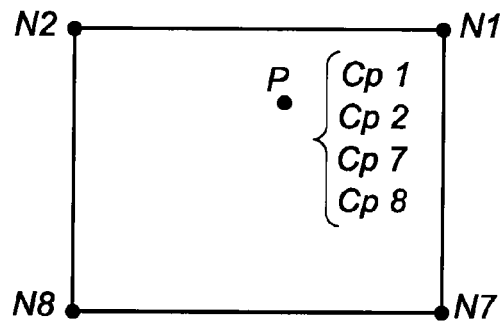
FIG. 6 is a schematic view of a section taken from the area shown in FIG. 3.

FIG. 6 shows a point P of the surface 11 located in a square of the grid 13, which is identified by its nodes N1, N2, N7 and N8. Its position in this square is defined by the weights to be assigned to each of the vertices of the square so that the point P is the barycentre of the four vertices, each of these being assigned the corresponding weight. Thus one obtains a set of four values (C1, C2, C7 and C8) which unequivocally determine the position of the point P on the second surface 11, knowing the square in which it is located.

We are now going to describe the machining method according to the invention that, starting from the first surface 10, enables us to obtain a third surface, that is as close as possible to the second surface 11 and which observes tangential continuity with the part of the blade not touched by machining.

The profile of the blade to be produced, that is to say that of the second surface 11, is defined by a theoretical digital model, contained for example in a CATIA program file, whereas the actual component, leaving smelting or forging, has a profile that is thickened at various points, in accordance with the first surface 10, to take account of potential fragilities or local working difficulties. The theoretical profile associated with the second surface 11 is represented in the theoretical CATIA digital file by the position of its points and the orientation of the vector normal to the second surface 11 at these points.

The first step in the process according to the invention is to define a grid 13 on the second surface 11, surrounding the entire machining area 8, that is to say the peripheral nodes of said grid all being outside the outer limit 12 of the machining area 8. This grid is a mesh of squares expressed by nodes N1 to N30, the coordinates of which are integrated in the CATIA file, in a Cartesian system associated with the machine tool. Similarly, the CATIA file includes data corresponding to the position of the bit of the tool 20 of the machine that is to perform the finishing operation and the orientation of its axis.

The second step consists of modelling the path to be followed by the tool 20 during machining of the first surface 10 so that the point of contact between it and the component describes the second surface 11 in the case where the points outside the machining area 8 are ideally placed, that is to say on the first surface 10. This path is defined firstly by the succession of positions of a point P which circulates inside the machining area 8 and thereby passes through each of the squares of the grid 13 and secondly by the required orientation of the tool axis at each of these points P. For this purpose each point P is defined relative to the four nodes of the square in which it is located by means of four coefficients, known as weighting coefficients $C_p i$ (i being the reference number of the node in question). Each weighting coefficient corresponds to the weight to be assigned to the corresponding node in order for point P to be the barycentre of these four nodes. In other words, the closer the point P is to a node, the higher the coefficient assigned to this node and, conversely, the nodes farthest away are assigned a low coefficient. In order for these weighting coefficients to be uniquely defined, they are reduced proportional to each other so that their sum is equal to 1. For example, if the point P is in the centre of the square, the four coefficients are all equal to 0.25; if it is close to one of the nodes, as shown in FIG. 6, the coefficient $C_p 1$ would equal 0.5, whilst the other three would be 0.35 for $C_p 2$, 0.10 for $C_p 7$ and 0.05 for $C_p 8$.

The file comprising the weightings of the points P to be scanned by the machine tool and the corresponding orientations of the tool axis is then converted into a format that can be understood by the digitally-controlled machine and loaded into its software.

The next step consists of calibrating the digital model input into the CATIA file with the actual surface of the blade, that is to say with the first surface 10. This stage serves to ensure that the third surface will coincide perfectly with the first surface 10 at the margin of the machining area 8 and that there is therefore no projection between the part of the vane outside the machining area 8 and this area. To achieve this the invention makes provision for measurement by probing the position of the nodes located at the margin of the machining area 8 on the component itself, in the normal way at each point on the vane surface. For each of these points this probing produces a differential value, known as a delta, between the position of the relevant point in the theoretical CATIA file and the real point measured by the probe. Application of a correction equal to this delta to the controlled position of the bit of the tool 20, along a direction normal to the surface, serves to guarantee that, for all the nodes outside the machining area 8, the tool bit will be flush with the surface of the vane without machining it or standing off from it.

To give an example relating to FIG. 3, the deltas are measured for nodes N1 to N6, nodes N7, N13, N19 and N25 which are located on the right-hand edge of area 8, nodes N6, N12, N18, N24 and N30 which are located on the left-hand edge and nodes N25 to N30 which are located on the bottom edge.

The invention then recommends defining the deltas, known as delta(Ni), for all the nodes Ni, based on the deltas measured on the nodes outside the machining area 8. The deltas of the nodes located inside the machining area are thus defined by interpolating between the deltas of adjacent nodes for which a delta has already been measured or calculated.

For example, with reference to FIG. 3, the delta of node N8 is defined by interpolating between the deltas of nodes N1, N2 and N7, taking account of the relative length of the segments connecting this node N8 to these other three nodes. The delta of node N9 is then calculated from the measured values of the deltas of nodes N2 and N3 and the calculated value of the delta of node N8. By repeating this operation for all the squares where three of the four nodes have a delta that is already known, one can gradually determine a delta for all the nodes.

In the particular case where one wanted to machine the theoretical profile of the vane, it would then be sufficient to give a value of zero to the deltas of the points inside the machining area 8.

The next step according to the invention consists of defining a positioning delta for all the points of contact P' between the component and the tool 20 during finishing. For this, the calculation of this delta takes account of the weighting coefficients previously calculated for the point P and the delta(Ni) differences of the nodes of the square in which the point P is located. The delta at point P, that is to say the correction to be applied to the point P of the second surface 11, is defined as being equal to the sum of the values obtained by multiplying each delta of a node by the weighting coefficient associated with it.

In the example of the point P located in the square formed by the four nodes N1, N2, N7 and N8, the value of delta(P) is equal to $C_P1*\text{delta}(N1)+C_{P2}*\text{delta}(N2)+C_P7*\text{delta}(N7)+C_P8*\text{delta}(N8)$.

This delta(P), difference which extends along the normal to the second surface 11 at point P, is then projected over the reference axes of the machine tool to determine the three components of the correction to be applied to the Cartesian coordinates given to the program controlling positioning of the tool bit during the finishing operation.

Thus machining is done by a digitally-controlled machine tool for which the bit position is at all times corrected by the value from the deltas of the nodes of the relevant square and weighting coefficients of the point where the said tool bit is located.

Due to readjustment of the position of the tool bit on the nodes close to the machining area 8 and interpolation from these nodes, it is ensured that the third surface thus obtained will be tangential to the un-machined surface of the intrados and that there will be no projection between the machining area 8 and the surface of the vane 1 around this area.

The process according to the invention has been described above in a case, as illustrated by FIG. 4, where all the nodes outside the machining area 8 are physically borne by the first surface 10, that is to say the nodes for which it is possible to measure the delta using a probe.

In referring to FIG. 5, it can be seen that the grid 13 may comprise nodes that are outside is the machining area 8 but are not borne by the intrados surface of the blade 1. The invention recommends that these nodes be assigned a delta obtained by linear interpolation between the deltas of the adjacent nodes that are borne by the first surface 10, once again taking account of the length of the segments connecting the relevant node to the nodes from which the interpolation is done.

In the example of the grid shown in FIG. 5, only nodes N8 to N11 can be measured by a probe. The delta value assigned to nodes 7 and 12 is that of nodes 8 and 11 respectively, and that of nodes 1 to 6 is taken to be equal to that of nodes 7 to 12 respectively.

Although the invention has been described using a grid formed by four-sided squares, it can also be implemented with a grid formed by triangles or any other closed polygon. Furthermore, it has been described by application to a turbine engine blade, but the process may be applied to any other component and remain within the scope of the invention.

The invention claimed is:

1. A method for finishing a shape of a component by machining, in which at least one area of the component is produced thicker than a required profile so as to present a thickened portion forming a first surface with a surrounding profile, the machining to remove the thickened portion, using a machine tool, to obtain a third surface based on a theoretical profile of the component defined by a second surface, the method comprising:

defining, on the second surface, a grid formed by intersecting lines forming nodes and delimiting squares by the respective lines and nodes, the grid being defined on the second surface and further covering an area of the component to be machined and extending so that an outer limit of the area of the component to be machined is completely enclosed within an outer limit of the grid, so that the outer limit of the area of the component to be machined divides the nodes with the outer limit of the grid into a first set of the nodes located outside the outer limit of the area of the component to be machined and a second set of the nodes located within the outer limit of the area of the component to be machined;

defining a position of points of contact of the machine tool along the theoretical profile, each point being enclosed by said respective square of the grid in which the point is located and being defined in relation to the nodes of the respective square using weighting coefficients assigned to the nodes of the respective square;

measuring the first surface of the component;

determining, for each node of the first set of nodes located outside the outer limit of the area of the component to be machined, a delta between the first surface of the component at the each node of the first set of nodes and the theoretical position of the each node of the first set of nodes on the second surface in a direction normal to the second surface;

calculating delta differences for each node of the second set of nodes located within the outer limit of the area of the component to be machined, by selecting the respective square to which the each node of the second set of nodes belongs and for which the delta differences of other nodes of the respective square are already known, and interpolating, from the data or data differences, a weighting according to a length of the segments connecting the nodes;

updating the position of the points of contact between the component and the machine tool, relative to the reference input into the machine tool, by a weighted sum of the deltas of the nodes of the respective square in which the respective point is enclosed, using the weighting coefficients; and machining the component using the machine tool based on the updated position of the points of contact.

2. The method according to claim 1, wherein the weighting coefficients correspond to a weight to be assigned to the nodes of the respective square so that the respective point enclosed by the respective square is a barycenter of the respective nodes assigned to the weighting coefficients.

3. The method according to claim 1, wherein the lines forming the grid are straight lines.

4. The method according to claim 1, wherein the squares are formed by four-sided polygons.

5. The method according to claim 1, wherein the squares are formed by three-sided polygons.

6. The method according to claim 1, wherein at least one of the nodes located outside the outer limit of the area of the component to be machined is not borne by the second surface, a delta difference for said node located outside the outer limit of the area of the component to be machined being calculated by interpolation, between delta differences of adjacent nodes borne by the second surface, the weighting according to the length of the segments connecting the nodes.

7. The method according to claim 1, wherein the first surface of the component is measured using a probe.

8. The method according to claim 1, wherein the machine tool is a milling tool.

\* \* \* \* \*